C. J. BARNES.
VINE CUTTER.
APPLICATION FILED JAN. 27, 1910.
989,224.
Patented Apr. 11, 1911.
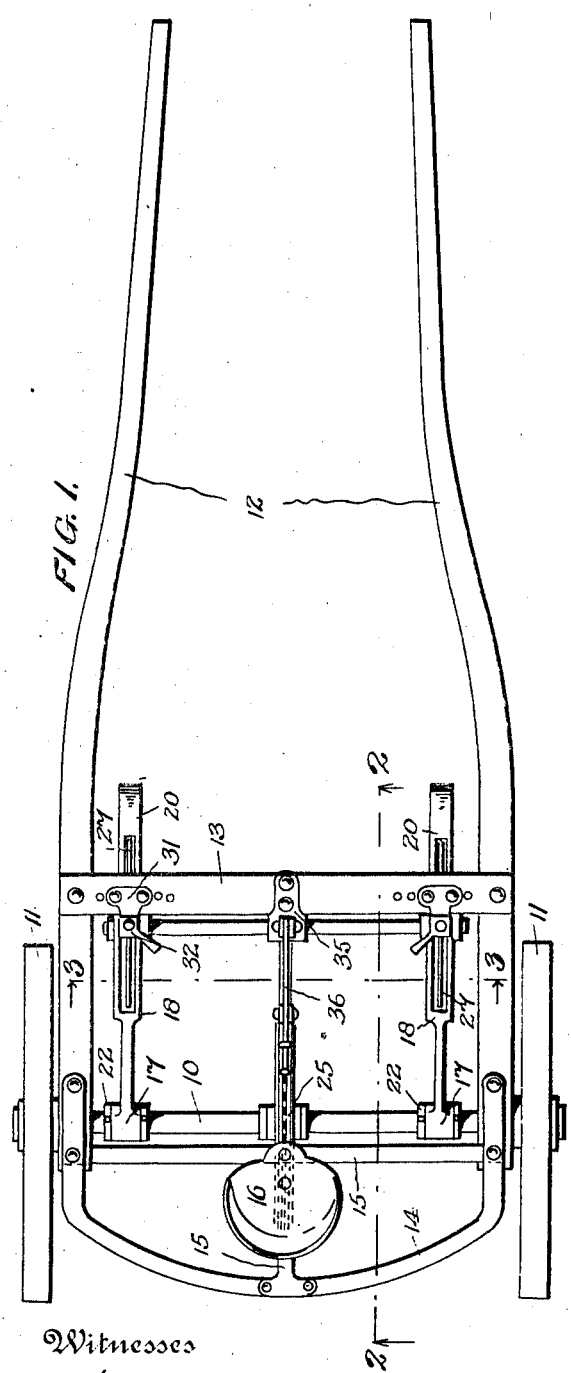
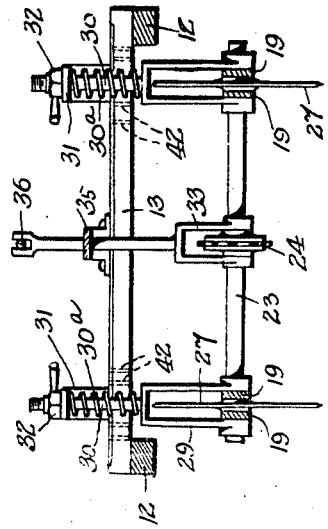
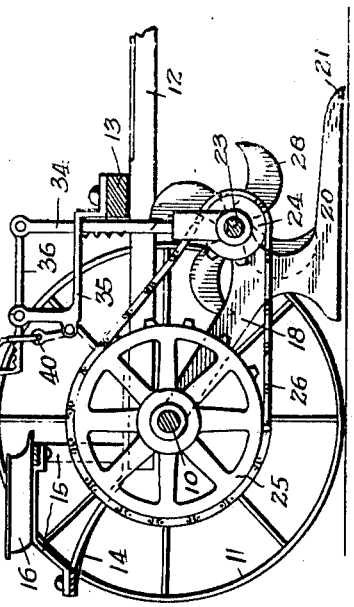
Witnesses
C. K. Davies
W. A. Pute
Inventor
Charles J. Barnes,
By Myron G. Clear.
Attorney

UNITED STATES PATENT OFFICE.

CHARLES J. BARNES, OF HOPKINS, VIRGINIA, ASSIGNOR OF ONE-HALF TO JOHN H. HOPKINS, OF HOPKINS, VIRGINIA.

VINE-CUTTER.

989,224.

Specification of Letters Patent. Patented Apr. 11, 1911.

Application filed January 27, 1910. Serial No. 540,346.

*To all whom it may concern:*

Be it known that I, CHARLES J. BARNES, a citizen of the United States, residing at Hopkins, in the county of Accomac and State of Virginia, have invented certain new and useful Improvements in Vine-Cutters, of which the following is a specification.

My invention relates to vine cutters, and more particularly to machines for cutting or trimming potato vines, my object being to provide a simple and strong device which will quickly, accurately and otherwise efficiently perform its functions.

A further object of my invention is to provide a device which embodies cutting mechanisms adjustable with respect to the ground and also with respect to each other to accord with different widths of drills.

With this in view my invention resides in the features of construction, arrangement and operation to be hereinafter described with reference to the accompanying drawing, in which, Figure 1, is a plan view of my improved apparatus or machine. Fig. 2, is a vertical longitudinal section therethrough on line 2—2 of Fig. 1, and, Fig. 3, is a vertical transverse section therethrough on line 3—3 of Fig. 1.

Referring to these figures, the frame of my improved machine comprises an axle or shaft 10, upon the ends of which are secured the traction wheels 11, and to which, adjacent said wheels 11, are journaled the rear ends of the forwardly extending draft bars 12. The bars 12 are connected, forwardly of the wheels 11, by a transverse beam 13, and to the rear ends of said bars are secured the ends of a U-shaped bar 14, to which are secured the bars 15, supporting a central seat 16.

Loosely journaled at their rear portions 17, upon shaft 10, are the shoe-frames 18, which are intermediately slotted and have forward intermediate extensions 19, also slotted, the lower shoes 20 being forwardly extended and having flat lower faces and slightly down-turned forward ends 21, to pick up the branches of the vines extending into the surface of the soil. The rear portions 17 are longitudinally adjustably held upon shaft 10, by set collars 22. Journaled through the intermediate forward extensions 19, is a shaft 23 which, as shown in Fig. 2, has a longitudinal flattened portion, and which carries a central sprocket wheel 24 by which it is rotated from the larger sprocket wheel 25 on the shaft 10, through a connecting sprocket chain 26.

The cutting wheels 27 are mounted, or rather splined, upon the shaft 23 between the intermediate forward extensions 19 of the shoe frames, to rotate with said shaft owing to its flattened portion, and to slide thereon when the shoe frames are adjusted toward or away from one another at their rear ends 17 upon shaft 10. The cutting wheels 27 have radial cutting blades 28 provided with convexly curved cutting edges which, in rotating, cut the branches of the vines picked up by the shoes 20.

Straddling the cutting wheel and extensions 19 of each shoe-frame, and journaled at its lower ends upon cutter-shaft 23, is a hanger 29, the upper vertical bar 30 of which extends through a bracket 31 upon the beam 13 and is provided with a spring 30ª coiled thereabout and compressed between said hanger and said bracket whereby to press the shoe 20 downwardly at all times into close contact with the soil. These vertical bars 30 have threaded upper ends with which engage nuts 32 having short handles whereby the extent of downward movement of the shoes may be regulated.

Straddling the gear wheel 24 of cutter-shaft 23 and journaled at its lower ends upon said shaft, is a hanger 33, the upper vertical bar 34 of which extends upwardly through a stationary bracket 35 upon beam 13, and has its upper extremity loosely connected to a horizontal lever 36, which lever is intermediately fulcrumed upon an upright rearward extension 37 of bracket 35, and has a rear handle 38 and notches 39 to be engaged by a latch link 40 having a handle 41. Thus the lever 36 may be latched when the same is operated to raise the cutter-shaft and shoe-frames at the end of a drill, whereby to hold the same up while turning into the next drills.

As shown in Figs. 1 and 2, the transverse beam 13 has series of openings 42 whereby the brackets 31 may be adjusted with the shoe-frames in their adjustment toward and away from one another to accord with different width drills.

Having thus fully described my invention, I claim:

1. In a machine of the character described, the combination of a frame embodying a wheeled shaft, spaced slotted shoes suspended within said frame, a cutter shaft, gearing connecting said shafts, cutting wheels mounted upon said cutter-shaft within said shoe slots, and means to adjust said shoes and cutters vertically with respect to the ground, and horizontally with respect to one another.

2. In a machine of the character described, the combination of a frame embodying a wheeled shaft, a cutter shaft, gearing connecting said shafts, cutting wheels splined in spaced relation upon said cutter shaft, shoe-frames having portions journaled upon both of said shafts, whereby said shoe-frames and said cutters may be adjusted toward and away from one another, said shoe-frames being provided with slots to receive said cutters, and with lower ground shoes, a hanger connected to and extending upwardly from said cutter shaft, and a lever engaging said hanger to raise and lower said cutter shaft and said cutters and shoe-frames.

3. In a machine of the character described, the combination of a frame embodying a wheeled shaft and a transverse beam, spaced slotted ground shoes having portions journaled upon said shaft, a cutter shaft connecting said shoes, gearing connecting said shafts, cutting wheels splined upon said cutter shaft within the shoe slots, a hanger journaled at its lower end upon said cutter shaft adjacent each of said shoes and having a threaded upper end, brackets mounted upon said frame beam and through which the upper ends of said hangers project, springs coiled about said hangers and compressed between a portion thereof and said brackets, and nuts to engage the threaded ends of said hangers whereby to adjust said shoes with relation to the ground, said brackets being adjustable longitudinally of said beam, whereby said shoes may be adjusted toward and away from one another.

In testimony whereof I affix my signature in presence of two witnesses.

CHARLES J. BARNES.

Witnesses:
 ROY D. WHITE,
 C. N. PARKS.